United States Patent
Jorgensen

[11] Patent Number: 5,810,227
[45] Date of Patent: Sep. 22, 1998

[54] MOTORCYCLE MOUNTED DOG CARRIER

[76] Inventor: Paul Jorgensen, 215 W. Main St., Middletown, Md. 21769

[21] Appl. No.: 844,198

[22] Filed: Apr. 28, 1997

Related U.S. Application Data

[63] Continuation-in-part of Ser. No. 516,872, Aug. 18, 1995, abandoned.

[51] Int. Cl.[6] ........................................................ B62T 7/04
[52] U.S. Cl. ........................ 224/413; 224/440; 224/275; 119/771; 119/792; 119/453; 280/304.5
[58] Field of Search ..................................... 224/413, 401, 224/412, 415, 440, 428, 429, 430, 433, 435, 275, 437; 119/769, 770, 771, 792, 452, 453; 280/304.5

[56] References Cited

U.S. PATENT DOCUMENTS

| | | | |
|---|---|---|---|
| 1,589,916 | 6/1926 | Whitmore | 119/771 |
| 3,813,018 | 5/1974 | Heltzen | 224/413 |
| 4,003,508 | 1/1977 | Hoops | 224/440 |
| 4,010,880 | 3/1977 | Guillot-Munoz | 224/275 |
| 4,125,213 | 11/1978 | Watkins | 224/413 |
| 4,512,286 | 4/1985 | Rux | 119/771 |
| 5,044,321 | 9/1991 | Selph | 119/96 |
| 5,123,377 | 6/1992 | Edwards | 119/771 |
| 5,133,294 | 7/1992 | Reid | 119/771 |
| 5,577,646 | 11/1996 | White | 224/422 |

*Primary Examiner*—Charles R. Eloshway
*Attorney, Agent, or Firm*—L. Ronald Jorgensen

[57] ABSTRACT

A carrier to transport an animal such as a dog on a motorcycle. The carrier has a base that conforms to the top surface of the motorcycle so the dog has a solid feel of the motorcycle. The base is firmly seated on the top surface of the motorcycle so there is no wobbling or slippage of the base as the motorcycle moves. The carrier has a housing that holds the dog's body. The, housing is flexible to allow the dog limited movement to balance with the motorcycle yet is firm to secure the dog. A harness holds the dog in the housing.

16 Claims, 6 Drawing Sheets

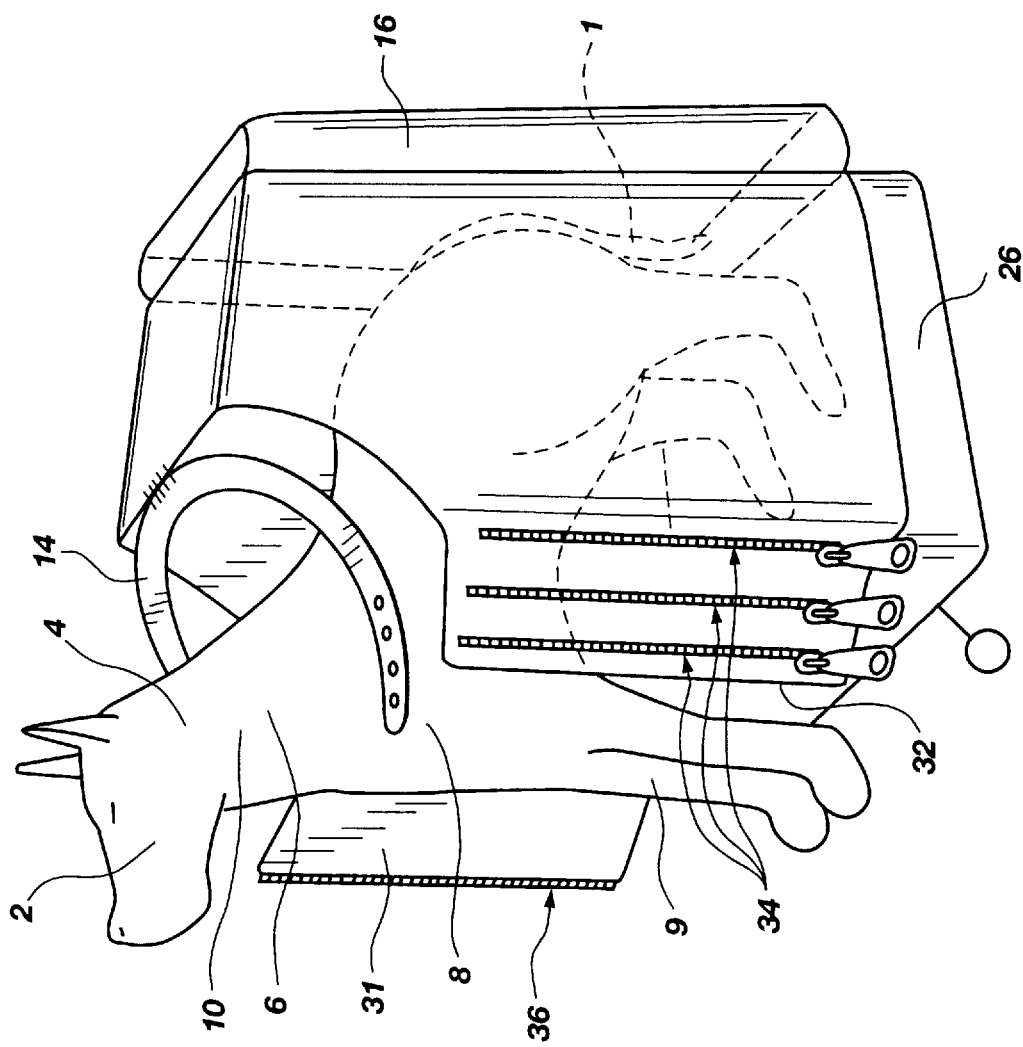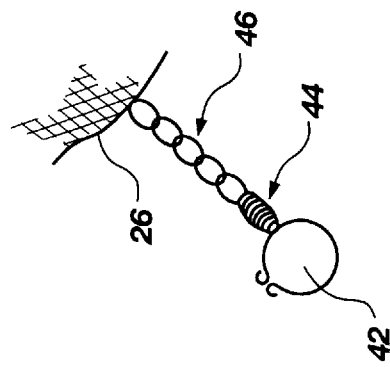

MOTORCYCLE MOUNTED DOG CARRIER

This application is a continuation-in-part of U.S. patent application Ser. No. 08/516,872, filed Aug. 18, 1995, now abandoned.

FIELD OF THE INVENTION

This invention relates to a carrier to transport an animal on a motorcycle. Many motorcycle riders own a dog. These riders need a dog carrier that easily mounts on a motorcycle.

SUMMARY OF THE INVENTION

This invention is a carrier to transport an animal on a motorcycle. It allows a properly trained dog to accompany a motorcyclist on a ride. At highway speeds, a rider controls a motorcycle by leaning it in the direction of travel. A trained dog, if correctly mounted in the carrier, tends to roll with the motorcycle. Thus, the dog will balance with, rather than against, the rider.

The dog must have a secure mount on the motorcycle. The carrier has a base that conforms to the top surface of the motorcycle so the dog has a solid feel of the motorcycle. The base is firmly seated on the top surface so there is no wobbling or slippage of the base as the motorcycle moves. The top surface of the motorcycle may be a seat, a fender, or a rack.

The carrier has a housing that holds a portion of the dog's body. The housing protects the dog, keeping the dog's body from touching moving wheels, hot pipes, or other hazardous areas of the motorcycle. The housing must be flexible to allow the dog limited movement to balance with the motorcycle, yet firm to secure the dog. The motorcycle may have a sissy bar. With the housing secured to the sissy bar, the carrier rides better.

A collar or harness restrains the dog so the dog cannot jump off or make sudden weight shifts that would unbalance the motorcycle. The dog's head and a portion of the dog's body is out of the carrier, allowing the dog to see and smell the scenery. The carrier is easily removed and stored.

Although this carrier may hold other animals besides a dog, the carrier is specifically designed for a medium size dog of twenty-five to seventy-five pounds. Other objects, features, and advantages of this invention will be apparent from the following description of the drawings, the preferred embodiment, and the claims.

DESCRIPTION OF THE DRAWINGS

FIG. 3 shows the dog backing into the carrier.

FIG. 4 shows the details of a means for holding the carrier to the motorcycle.

DESCRIPTION OF THE PREFERRED EMBODIMENT

Figure 1:
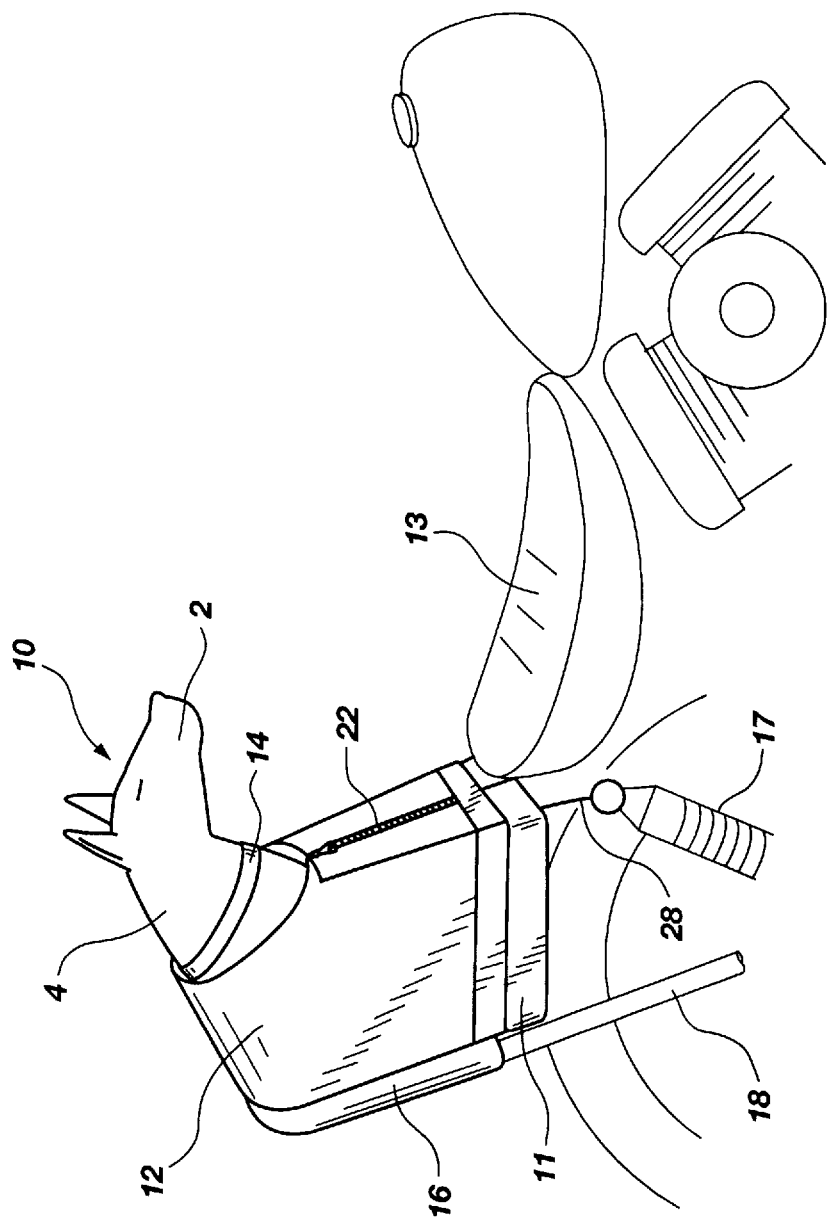
FIG. 1 shows the dog carrier mounted on a motorcycle carrier.

In FIG. 1, a motorcycle mounted dog carrier holds a medium sized dog 10 of about twenty-five to seventy-five pounds. The dog carrier rides on the motorcycle's top surface. The top surface may be a passenger seat 11, a fender, or a rack. Normally, the carrier is behind the main motorcycle seat 13. The housing 12 loosely confines the dog's body in an unstressed position. The housing is shaped and sized to the contour of the sitting dog. The housing encloses the dog except for its head 2 and neck 4.

A dog harness holds the dog in the housing. As shown in FIG. 1, the harness may be a simple adjustable dog collar 14. The collar fits around the dog's neck, holding the dog in the carrier. A sissy bar sleeve 16 attaches to the housing. The sissy bar sleeve is sized to slip over a sissy bar 18. A means for holding the carrier to the motorcycle 28 secures the carrier to the motorcycle. In FIG. 1, the means for holding the carrier to the motorcycle is secured to a rear shock absorber bolt 17. Typical motorcycles have many such protruding bolts that may be used to secure the carrier.

Figure 2:
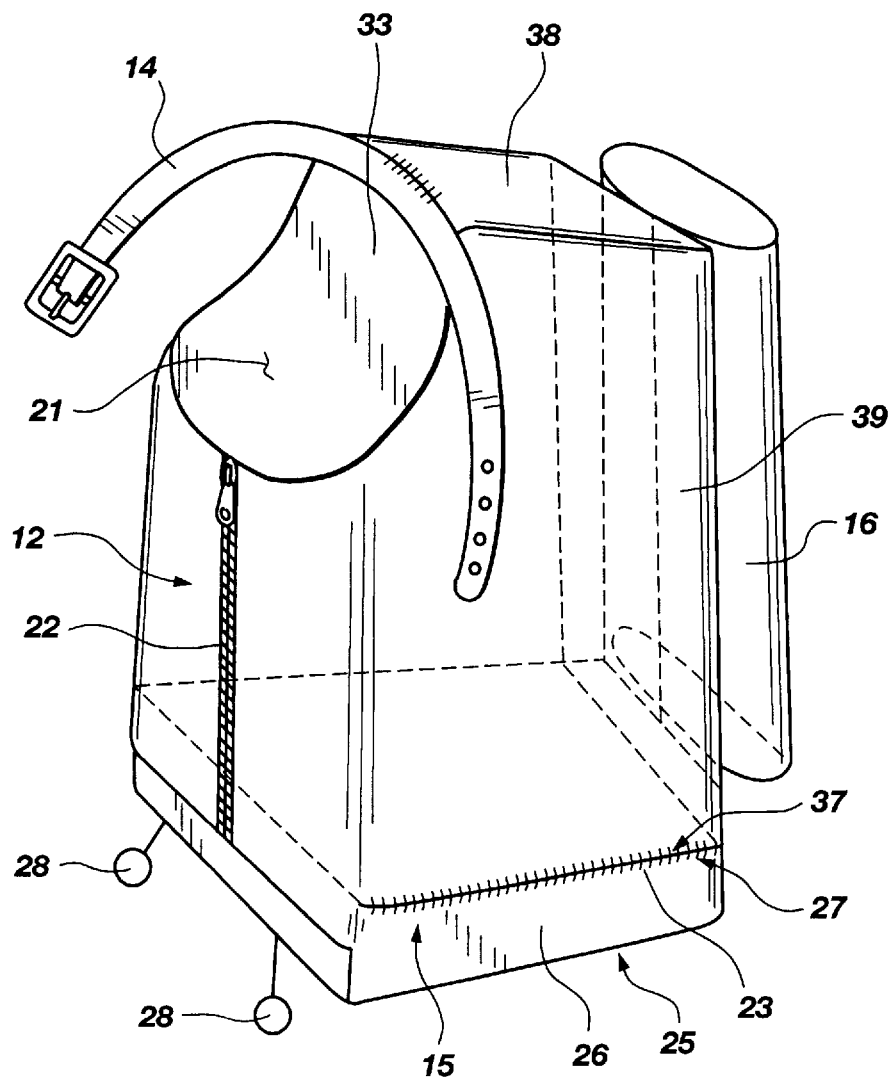
FIG. 2 shows the unmounted dog carrier.

In FIG. 2, the carrier for transporting a dog on a motorcycle has a base 26 formed to mount on the top surface of a motorcycle. The base has a top 23 and a bottom 25, with an edge 27 along the top of the base. The bottom of the base is shaped to conform generally to the top surface of a motorcycle. The base is rigid or semirigid, so, with the base mounted on the top surface of the motorcycle, the dog sitting on the base has a solid feel of the motorcycle.

Attached to the base is the housing 12. The housing has a top 38 and sides 39, with an edge along the bottom of the sides 37. The edge of the housing is sewn to the edge of the base forming a seam 15 so the base and the housing are one unit. The base and the top and the sides of the housing form a cavity 33. The cavity is sized and shaped generally to the dog's body so the dog's body is loosely confined within the cavity in an unstressed position.

The top and sides of the housing are of semirigid material. The housing is flexible enough so the dog has limited movement to balance as the motorcycle moves and leans, yet is firm enough to secure the dog. The housing has a head sized hole 21.

Leather is an ideal material for the base and housing. Leather is both semirigid and flexible. As the leather dog carrier is used, it molds itself to the particular motorcycle and to the shape of the particular dog. A stiff leather belt along the seam stiffens the bottom portion of the housing and the base, making the base more rigid. A wood frame along the base's edge may also stiffen the base.

A means for holding the base to the motorcycle 28 secures the base so the base firmly rides on the top surface of the motorcycle. The base must not slip or wobble as the motorcycle moves. The means for holding the base may be a chain, rope, or an adjustable tie down strap.

A sissy bar sleeve 16 attaches to the housing, the sissy bar sleeve sized to slip over a sissy bar. In FIG. 2, the sissy bar sleeve is a round tube attached to the housing along a single seam. The single seam gives the housing some flexibility, allowing the dog to balance its body with the motorcycle.

The dog may sit on a pad placed over the base or the base may be padded. However, a thick pad is undesirable since it raises the dog's center of mass, unbalancing the motorcycle. If the carrier is on a seat, no padding is necessary.

In FIG. 3, below the head hole is an opening sized to the dog's body. The dog 10 backs into the housing. The dog has a head 2, a neck 4, shoulders 6, body 8, legs 9, and a tail 1.

There is a means for closing the opening to secure the dog within the housing. The means for closing the opening keeps the dog from exiting the housing. The means for closing the larger opening is shown as a left flap 31 and a right flap 32 attached to the housing. The left flap has a left half of a zipper 36. The right flap has several matching right halves of the zippers 34. When the halves of the zipper are zipped together, the dog is secured inside the housing. The closed zipper 22 is shown in FIGS. 1 and 2. The several matching right halves of the zippers 34, shown in FIG. 3, allow the motorcyclist to adjust the carrier to fit the size of the dog.

The collar and housing shown in FIGS. 1, 2, and 3 secure the dog on the motorcycle so that the dog cannot escape or make any sudden movements that throws the motorcycle off balance. Yet the housing is flexible, allowing the dog to naturally take a proper balanced position on the motorcycle and to keep his weight balanced as the motorcycle leans. The motorcycle is easier to control if the dog keeps its weight balanced.

In FIG. 4, the means for holding the base on the motorcycle includes a lock ring 42 and a swivel 44 attached to the lock ring. A chain 46 attaches the swivel to the base.

Figure 5:
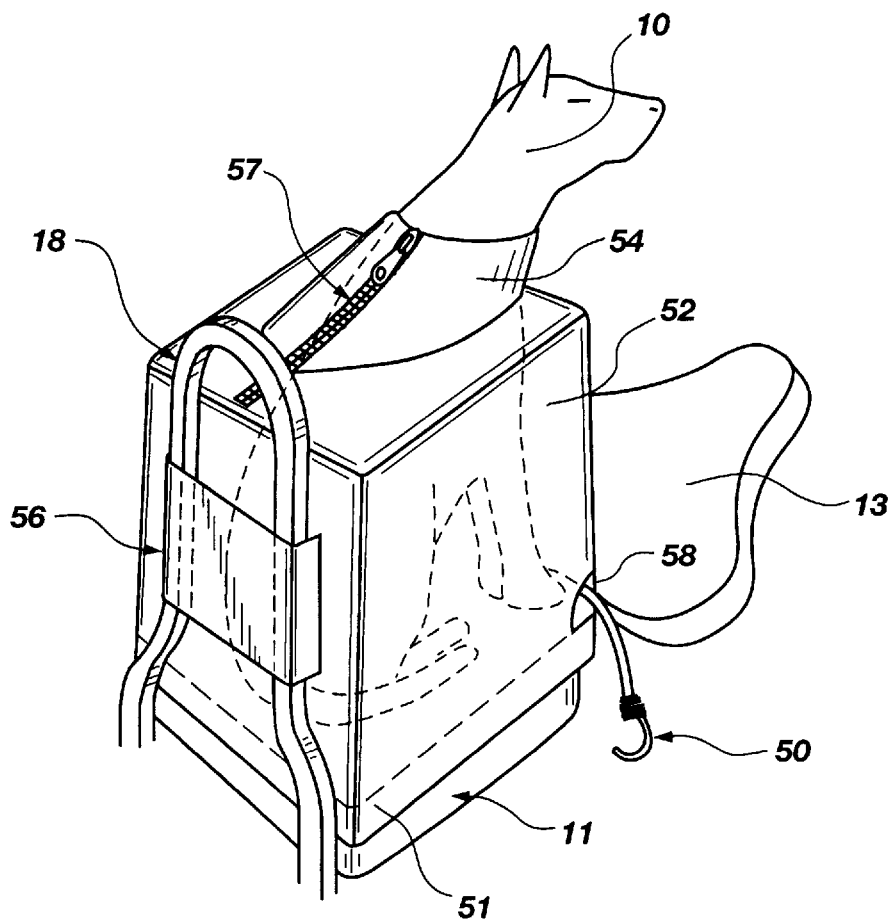
FIG. 5 shows a rear view of a second embodiment of the dog carrier.

In FIG. 5, the motorcycle mounted dog carrier holds a dog 10. The dog carrier rides on the motorcycle's passenger seat 11 or on the fender behind the main motorcycle seat 13. The housing 52 loosely confines the dog's body in an unstressed position, the housing shaped and sized to the contour of the sitting dog. The housing encloses the dog except the dog's head.

The collar 54 or harness is enlarged, becoming an extension of the housing. The means for closing the larger opening 57 also closes the collar. The collar fits around the dog's neck, holding the dog in the carrier.

A sissy bar sleeve 56 attaches to the housing, the sissy bar sleeve sized to slip over a sissy bar 18. A tie down strap 50 is the means for holding the carrier to the motorcycle. Tie down straps are commercially available and often used by riders to secure items to their motorcycles. The tie down strap threads through small holes 58 on the sides of the housing. The ends of the tie down strap are secured to motorcycle.

The carrier has a base 51 formed to fit the contour of the top surface of the motorcycle. The housing and base form a boxed shaped cavity generally sized and shaped to the dog's body so the dog's body is loosely confined in the cavity in an unstressed position.

Figure 6:
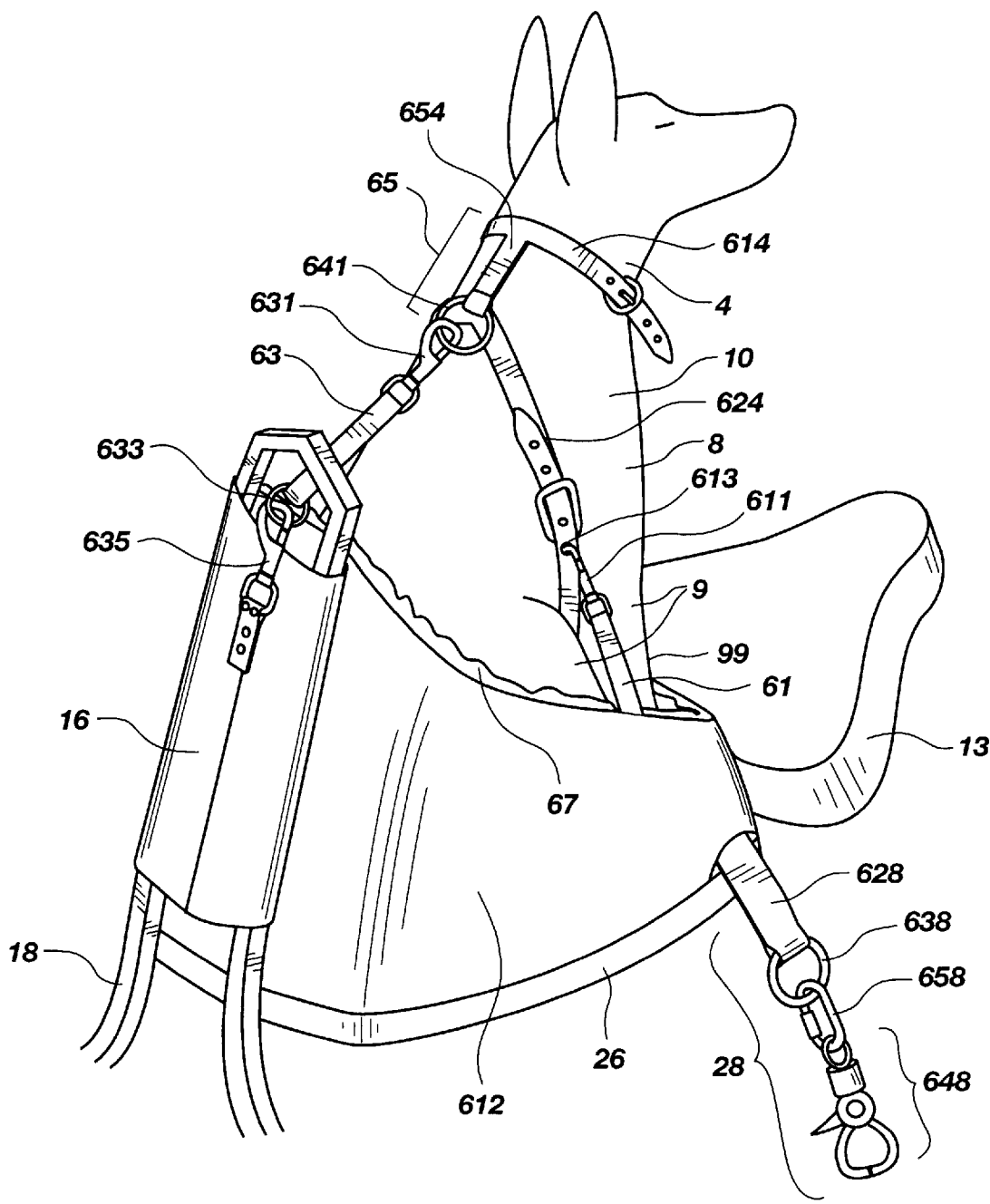
FIG. 6 shows a third embodiment of the dog carrier with a medium sized dog.

FIG. 6 shows another embodiment, with the dog carrier riding behind the main motorcycle seat 13. A housing 612 is attached to the base 26. However, the housing 612 covers the legs 9 and only a portion of the body 8 of a medium sized dog 10 of about twenty-five to seventy-five pounds. Side straps 61 and a back strap 63 are attached to a harness 65, thus securing the dog within the housing.

The dog harness 65 is a standard dog harness consisting of an adjustable collar strap 614 around the dog's neck 4, an adjustable belly strap 624 around the body of the dog behind the front legs 99, and a wither strap 654 connecting the collar strap to the belly strap. A leash ring 641 is attached to the wither strap 654.

The side straps 61 attach directly to the inside of the housing. A first swivel lock hook 611 connects each side strap to the belly strap 624 through a hole 613 in the belly strap. The back strap includes a back strap ring 633 and a second swivel lock hook 631 that connects the back strap to the leash ring 641. A third swivel lock hook 635, attached to a sissy bar sleeve 16, secures the back strap ring. The sissy bar sleeve fits over the sissy bar 18. The back strap could also be attached directly to the inside of the housing rather than to the sissy bar sleeve.

Sheepskin 67 lines the interior of the cavity formed by the housing and the base. The sheepskin lining protects the skin of the dog. Otherwise, with only leather cushioning the dog's skin from the metal frame of the sissy bar, the fur will rub off, causing bare patches to appear on the dog's skin. The means for securing the dog carrier to the motorcycle 28 consists of a strap 628, a D ring secured on the strap 638, and a lock clip 648 for locking on protruding bolts of the motorcycle. A lock ring 658 secures the lock clip to the D ring.

Figure 7:
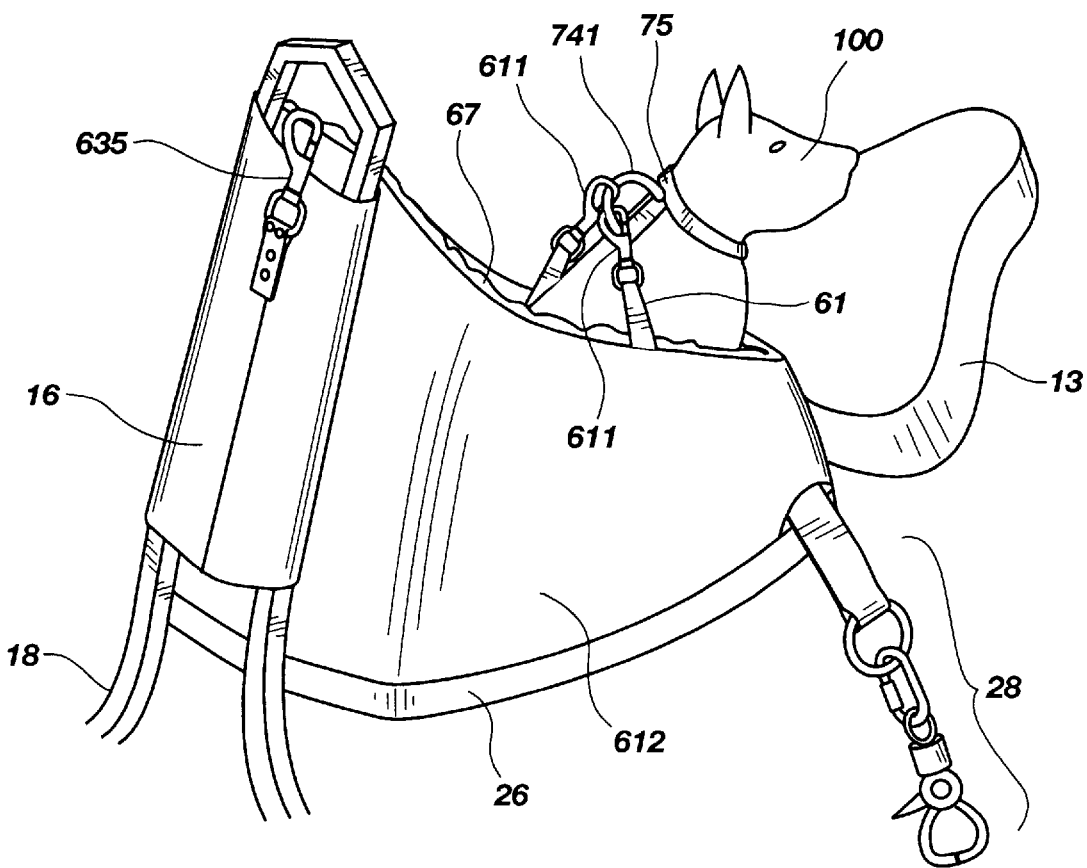
FIG. 7 shows the dog carrier of FIG. 6 with a small dog.

FIG. 7 shows the adaptability of the dog carrier shown in FIG. 6. In FIG. 7, a small dog 100 has replaced the medium sized dog 10 of FIG. 6. The small dog is wearing a small dog harness 75 similar to, but smaller than, the harness 65 shown in FIG. 6. The swivel lock hooks 611, attached to the side straps 61, directly connect to a D shaped leash ring 741 on the small dog harness 75. The back strap 63 has been removed, leaving the first swivel lock hook 635 hanging free. The dog carrier shown in FIGS. 6 and 7 may be adjusted to fit a whole range of dogs by adjusting the configuration and lengths of the back and side straps.

The embodiment shown in FIGS. 6 and 7 still protects the dog, with the housing keeping the dog's body from touching moving wheels, hot pipes, or other hazardous areas of the motorcycle. With the straps and harness holding the dog in the housing, the carrier still secures the dog on the motorcycle so that the dog cannot escape or make any sudden movement that could throw the motorcycle off balance. Yet this embodiment is extremely flexible, fitting dogs of a range of sizes and shapes, allowing each dog enough movement to take a naturally balanced position on the motorcycle.

Since the embodiments described above are narrower than the scope of this invention, only the claims limit this invention.

I claim:

1. A motorcycle mounted animal carrier, the animal having a body, head, neck, shoulders, and legs, the motorcycle having a top surface; the motorcycle mounted animal carrier comprising:

a base formed to mount on the top surface of the motorcycle, the base providing the animal with a solid feel of the motorcycle;

a housing for confining at least the body and legs of the animal in an unstressed position, the housing having walls made of a flexible material which conform to the contour of at least the animal's body and legs, the housing attached to the base so that the animal sits on the base when the animal is in the housing;

means for holding the base to the top surface of the motorcycle, so that with the base being fitted over the motorcycle, the base and housing stay secure on the motorcycle; and, a harness attached to the housing, the harness securing the animal on the base and in the housing; wherein, the walls of the housing are movable with the animal relative to the base such that as the animal leans with the motorcycle, the walls of the housing move with the animal to support the animal and allow the animal to balance with the motorcycle rider.

2. The motorcycle mounted animal carrier of claim 1 wherein the harness is a dog collar.

3. The motorcycle mounted animal carrier of claim 1 further comprising a means for attaching the carrier to a sissy bar.

4. The motorcycle mounted animal carrier of claim 3 wherein the means for attaching the carrier to a sissy bar is a sleeve attached to the housing, the sleeve sized to slip over a sissy bar.

5. The motorcycle mounted animal carrier of claim 1 wherein the housing has a head hole to allow the animal's head to emerge from the housing.

6. The motorcycle mounted animal carrier of claim 1 wherein the base is padded.

7. The motorcycle mounted animal carrier of claim 1, the top surface of the motorcycle having a rider's seat, wherein the base is adopted to be mounted immediately behind the rider's seat.

8. The motorcycle mounted animal carrier of claim 1, the top surface of the motorcycle having a rider's and a passenger seat, wherein the base is adopted to be mounted on the passenger seat.

9. A motorcycle mounted animal carrier, the animal having a body, head, neck, shoulders, and legs and wearing a harness and the motorcycle having a top surface; the motorcycle mounted animal carrier comprising:

a base formed to mount on the top surface of the motorcycle;

a housing for confining at least the body and lets of the animal in an unstressed position, the housing having walls made of a flexible material which conform to the contour of at least the animal's body and legs, the housing attached to the base so that the animal sits on the base when the animal is in tie housing;

means for holding the base to the top surface of the motorcycle, so that with the base being fitted over the motorcycle, the base and housing stay secure on the motorcycle; and, means for attaching the harness to the carrier, so that with the animal wearing the harness, the animal is secured on the base and in the housing wherein, the walls of the housing are movable with the animal relative to the base such that as the animal leans with the motorcycle, the walls of the housing move with the animal to support the animal and allow the animal to balance with the motorcycle rider.

10. The motorcycle mounted animal carrier of claim 9 further comprising a means for attaching the carrier to a sissy bar.

11. The motorcycle mounted animal carrier of claim 10 wherein the means for attaching the carrier to a sissy bar is a sleeve attached to the housing, the sleeve sized to slip over a sissy bar.

12. The motorcycle mounted animal carrier of claim 11 wherein the means for attaching the harness to the carrier comprises a strap attached to the sissy bar sleeve and extending to and adapted for attaching on the harness.

13. The motorcycle mounted animal carrier of claim 9 wherein the base is padded.

14. The motorcycle mounted animal carrier of claim 9 wherein the means for attaching the harness to the carrier comprises a strap attached to the housing and extending to and adapted for attaching on the harness.

15. The motorcycle mounted animal carrier of claim 9, the top surface of the motorcycle having a rider's seat, wherein the base is adopted to be mounted immediately behind the rider's seat.

16. The motorcycle mounted animal carrier of claim 9, the top surface of the motorcycle having a rider's and a passenger seat, wherein the base is adopted to be mounted on the passenger seat.

* * * * *